Feb. 14, 1961  A. T. RACE, JR  2,971,778
PIPE WITH COUPLING ENDS AND METHOD OF ATTACHING
Filed Oct. 19, 1955  2 Sheets-Sheet 2
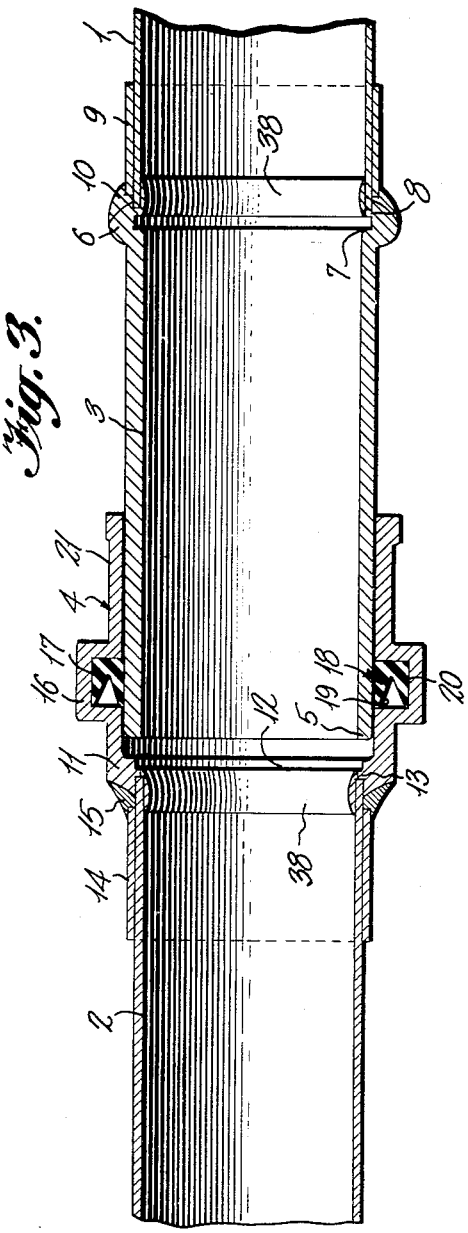
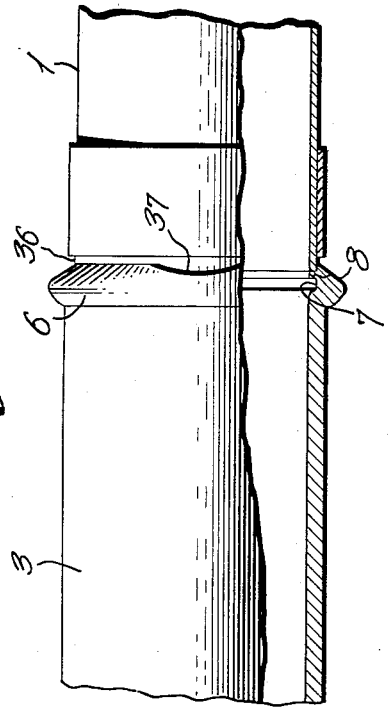
INVENTOR
Austin T. Race, Jr.
BY
ATTORNEYS United States Patent Office 2,971,778
Patented Feb. 14, 1961

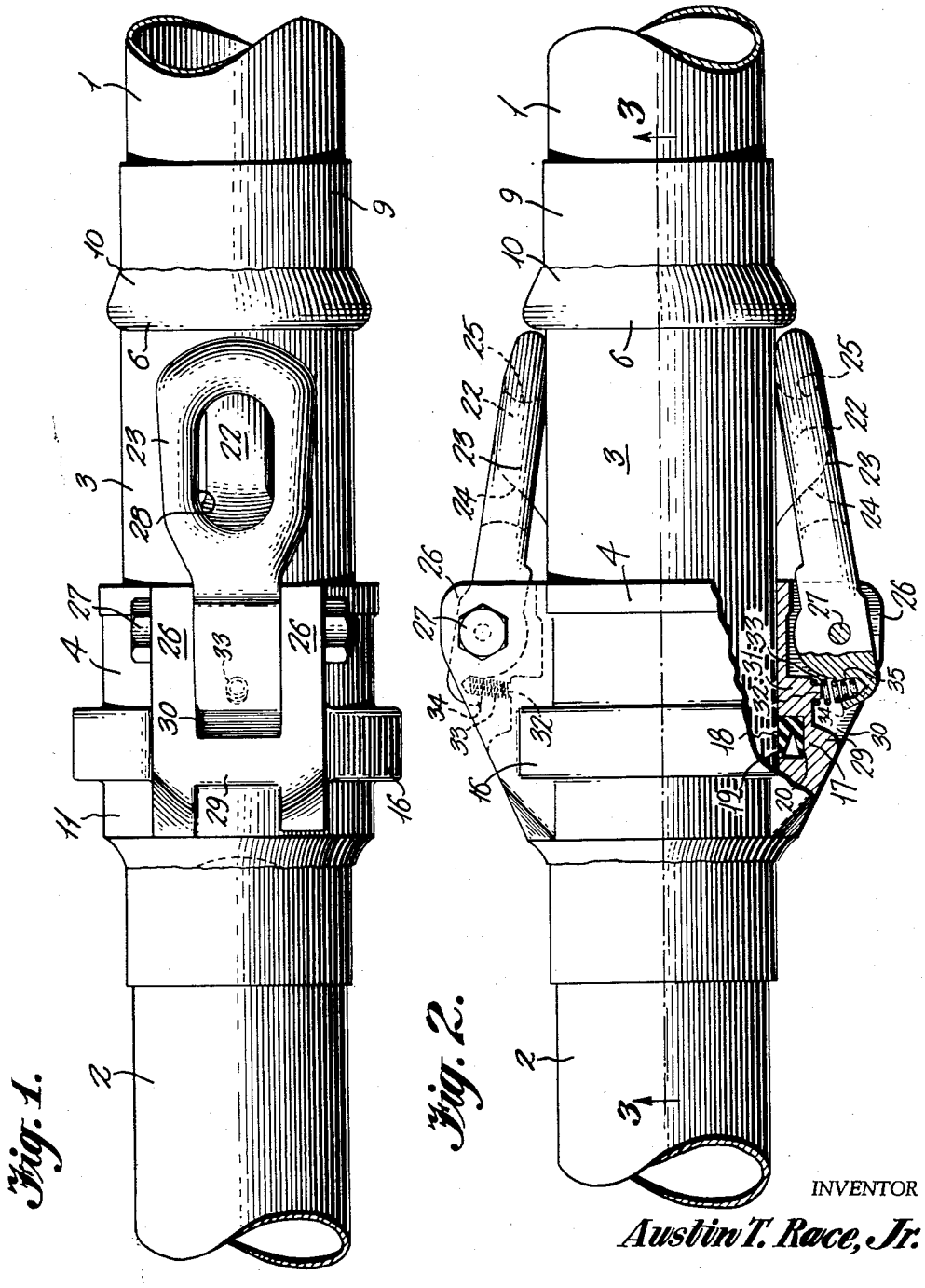

2,971,778
PIPE WITH COUPLING ENDS AND METHOD OF ATTACHING
Austin T. Race, Jr., Winter Haven, Fla.
Filed Oct. 19, 1955, Ser. No. 541,397
1 Claim. (Cl. 285—6)

This invention relates to pipe fitted with couplings at the ends which automatically interlock when two sections of pipe are fitted together, and particularly to such pipe for heavy duty industrial use, and to the method of attaching the couplings to the pipe.

Pipe of the general type of that of the present invention is used quite extensively, particularly in connection with irrigation. Sections of pipe of considerable length of light weight material, such as aluminum, are fitted with male couplings at one end and female couplings at the other. The female coupling has a flexible gasket which tightly embraces the male end of the next section, when inserted, and the sections automatically interlock.

It has been found that conventional pipe of this type will not hold the high pressure necessary for industrial use, but will blow out at the joint between the pipe and coupling, or, if the joint is welded, burst the pipe in the area adjacent the coupling annealed by welding. These high pressures, particularly in air and gas lines, will also cause the coupled male members to "float" within the female members, sometimes resulting in uncoupling or damage to the pipe or couplings. Heavy duty high pressure pipe is needed for oil lines, gas lines, mining, fire lines, Civil Defense, etc.

The primary object of the present invention is to provide pipe which may be automatically engaged with other similar pipe, and will withstand extremely high pressures.

A more specific object is the provision of such pipe having couplings at the ends, with the joints between the pipe and couplings sealed and the pipe reinforced in the coupling area.

Another object is to provide a novel method of reinforcing the pipe and joining the coupling to the reinforced pipe end.

A further object is to provide pipe with novel provisions for seating a sealing gasket to permit closer tolerance between joined male and female couplings.

Still another object is the provision of automatic locking means so arranged as to provide a balanced pull between the sections for greater stability and strength.

Yet another object is the provision of spring biased interlocking means to facilitate coupling and prevent accidental uncoupling, with the spring arranged to prevent dislodgement and breakage.

It is also an object to provide locking means which will permit relative movement of the coupled sections to compensate for expansion and contraction due to temperature changes.

Other objects of the invention will become apparent from the following description of one practical embodiment thereof, when taken in conjunction with the drawings which accompany, and form part of, this specification.

In the drawings:

Figure 1 is a side elevational view of the opposite ends to two sections of pipe embodying the principles of the present invention, with the sections coupled together;

Figure 2 is a top plan view of the pipe shown in Figure 1;

Figure 3 is a longitudinal section through the structure, and is taken on the line 3—3 of Figure 2; and Figure 4 is a view of the female end of the pipe, partly in elevation and partly in section, before the coupling and reinforcement are joined to the pipe.

Referring to the drawings in detail, the pipe is equipped with couplings at both ends. Although the ends of adjacent sections of pipe have been shown to illustrate a complete coupling, it will be understood that each length of pipe will have a male coupling element attached to one end and a female coupling element on the other end, so that the pipe may be joined to other similarly fitted lengths of pipe. As shown, the pipe ends 1 and 2 are provided with the male and female coupling elements 3 and 4 respectively.

As mentioned above, the pipe and fittings will be of light weight material. This could be aluminum, light weight steel, copper or magnesium.

The male element 3 consists of a cast or extruded length of tubing having a tapered, or rounded, end 5 for ease in inserting into the end of the female coupling. The opposite end of the male end, that is the end to be fitted to the pipe, has an annular rib 6 to increase its wall thickness. A recess 7 is formed in this end, and an annular rib 8 within the recess provides a seat to receive the end of the pipe 1. If the element 3 is cast, the recess and ribs will be formed during casting. If the element is extruded, they may be machined. A sleeves 9 surrounds the pipe adjacent the coupling, and the pipe, sleeve and coupling are welded together, as at 10, in a manner to be described later.

The female coupling member is a casting. It, like the male member, has its wall thickened at its end, as at 11, with the recess 12 and an inner annular rib 13 to seat the pipe end. A sleeve 14 surrounds the pipe end and the pipe, sleeve and casting are welded, as at 15. A circumferential rib 16 is provided medially of the casting and recessed internally to form an annular chamber 17 to recieve the sealing gasket 18. Gasket 18 is made of rubber, synthetic material, plastics, etc., and has the wings 19, to seal the base of the recess, and 20, to seal against the male member. The medial position of the gasket and its offset seat permit a better balanced holding of the male end and reduce relative canting and floating of the coupling elements. The gasket is better housed than in former arrangements, and prevents gasket blowouts. With this gasket seating arrangement, the entire interior of the bell portion 21 of the casting, with the exception of the gasket recess, can be the same diameter. This permits much closer tolerance between the male and female units with a consequent gain in stability.

The two coupling elements, are fastened together by means of locking lugs 22, carried by the male member, and locking links 23, carried by the female member. It has been the practice to use but one locking lug and link, but for high pressure lines it is desirable to use more than one in order to prevent canting of the elements and to obtain a balanced pull on the locking members. Plural locking members also are effective in eliminating floating. Although it is not essential that the locking members be equally spaced around the couplings, they probably will be so arranged in practice. Two lugs and two links diametrically opposed have been illustrated. The lugs have inclined front surfaces 24 up which the links may ride to seat behind the lugs. The rear faces 25 of the lugs are concave to hold the links in position. The locking links are bar links, and have their solid rear ends pivotally mounted between pairs of spaced ears 26 which project outwardly from the casting. A pivot pin 27 passes through the ears and link. The forward ends of the links have eyes 28 formed in them for engagement over lugs 22. Although the links have been described as having eyes, it will be apparent that the outer ends of the links may be of any open formation to fit over the lugs. The eye, hook, open link, etc. will be of sufficient length to permit relative lengthwise movement of the pipe sections to compensate for expansion and contraction.

It has been found desirable to spring bias the links to insure latching when the couplings are engaged and to prevent accidental unlatching. It is important, if springs are to be used, that they be mounted so that they will not be dislodged or broken by small sticks, stones or other debris which might be encountered in use. To accomplish this, a bridge 29 spans the space between each pair of ears 26 near their forward ends. This forms a rearwardly opening U-shaped recess 30 to receive the links. The link is dimensioned to substantially fill the recess to prevent debris from falling into it. A built-up shelf 31 is in the bottom of the recess and carries a stud 32 upon which a coiled spring 33 is mounted. The rear end of the link has a rearwardly projecting lip 34, which cooperates with shelf 31 to limit the outward swinging movement of the link. The lip is bored from the underside to form a pocket 35 into which the spring projects and is seated. The lip not only houses a portion of the spring, but with the bridge 29 shields the exposed part to prevent dislodgement or breakage. It will be noted that the stud 32 extends up into the exposed portion of the spring a sufficient distance so that it is practically impossible for a foreign object to pull the spring from its seat.

A proper joint at and adjacent the welds 10 and 15 is of utmost importance. It is well known that the heat of the welding process is sufficient to anneal aluminum at the weld and for a distance therefrom. This adversely affects the strength of the material and, when pressure is applied, will cause it to rupture in the annealed area before the rated pressure for the particular material has been reached. A weld, however, seems to be the only joint which is satisfactory for high pressure use. In order to have a welded joint between the pipe and coupling members, it has been found necessary to reinforce the pipe and employ special welding techniques.

To make the joint, the coupling member end is thickened and the recess and annular rib are provided as described. As the structure of the pipe ends is identical, and the ends of the coupling members to be joined to the pipe are structurally the same, only one end will be described.

Figure 4 shows a male end seated in one end of a pipe with the sleeve in place on the pipe. The pipe is inserted into the coupling recess until it seats firmly against the annular rib. The sleeve fits tightly on the pipe and is put in place before the casting is put on the pipe. The sleeve is adjusted so that its edge is spaced back from the edge of the pipe a greater distance than the distance from the coupling edge to the rib, so that when the casting is in place there will be a gap between the end of the casting and the edge of the sleeve, as shown at 36 in Figure 4. It has been found that a perfect joint cannot be obtained if the welding of casting, pipe and sleeve is done simultaneously. Welds so made do not penetrate evenly throughout the inner circumference of the pipe and almost invariably leak when subjected to pressure.

A weld by means of which the casting and pipe are first joined, and that assembly then joined to the sleeve has given highly satisfactory results. Adequate strength at the joint is obtained, and the sleeve serves to reinforce the weakened pipe area. Failure of pipe so made will be in the pipe itself, intermediate the end sections, rather than in the castings, joints or reinforced areas.

In making the weld it is necessary that penetration to the inner surface of the pipe be had, and desirable that the pipe metal flow to seal across the juncture between the pipe and rib. Otherwise, leakage may occur between the rib and pipe end, and out between the pipe and sleeve. If the flow-over is imperfect moisture or foreign particles may be trapped in the opening and eventually cause corrosion.

The weld is made in two continuous passes while the pipe is being rotated. In order to assure proper penetration, it is necessary to remove metal from the coupling member at the point where the weld is to start. This is done by grinding an inclined arcuate surface 37 on the coupling end. Thus the metal at the starting point will be thinner and penetration will be almost automatic without burning a hole through at the start. The thinner section is also necessary to keep the weld at the end of the first pass. If the metal is not thinned at the starting point and enough thin metal left to complete the lap-over, penetration will not be complete at the starting point and there will be a slight gap. The arcuate cut-out 37 provides more space between the edge of the sleeve and the coupling metal allowing the welder to get closer to the pipe when he strikes his arc. After one complete revolution, part of this space is left for the welder to joint the penetration at the starting point and then to continue with a second pass tying the first pass and the sleeve together.

It will be seen that the pipe and coupling are joined during the first pass and the sleeve joined to the pipe and coupling during the second pass. Although it is not absolutely necessary to use a chill plate inside the pipe during the welding operation to prevent dripping and undue flowing of the material the use of such a plate will assure a more even ridge of penetration into the inner pipe.

The resulting joint is pressure tight. If a joint is cut through, the sleeve, pipe and coupling will be found to be integral in the area adjacent the casting. The interior of the pipe will have a ridge 38 formed by metal which flowed, bridging over the pipe and rib edges. All meeting surfaces will be completely sealed over.

It will be obvious that the same welding procedure can be followed when the pipe end is simply brought flush with the coupling end and not inserted into the end of the coupling. When this procedure is followed it, of course, will be necessary to employ some means for holding the pipe and coupling in axial alignment.

By reason of the fluid tight joint between the pipe and end coupling with the pipe reinforced in the annealed areas, the gasket arrangement permitting close-fitting male and female couplings, and the use of a plurality of spring biased locking means, pipe has been provided which will withstand extremely high pressure without leakage or floating or canting of the coupling members when joined.

While in the above one practical embodiment of the invention has been disclosed, it will be understood that the structural details illustrated and described are merely by way of example, and the invention may take other forms within the scope of the appended claim.

What is claimed is:

A method of joining a coupling to the end of a section of tubing comprising, providing a thickened wall section on one end of a coupling, snugly fitting a sleeve over the end of the tubing leaving a length of the tubing end projecting beyond the sleeve, inserting the tubing end into the coupling with the end of the sleeve spaced from the end of the coupling, and rotating the tubing, sleeve, and coupling through one complete revolution, applying welding means to the coupling and tubing to fuse said inserted end of the tubing and said coupling together in a first complete circumferential pass and during said first pass so directing and operating said welding means on said enlarged coupling end and tubing end that the heat of fusion will not substantially affect the end of said sleeve adjacent said coupling end, rotating said coupling, tube and sleeve through a second complete revolution, applying said welding means to said tubing, sleeve and coupling in such a manner that the heat thereof is concentrated in the said space between said sleeve and said coupling and thereby fusing together said sleeve, coupling and tube by said welding means during said second complete revolution.

References Cited in the file of this patent

UNITED STATES PATENTS

| | | | |
|---|---|---|---|
| 729,479 | Wittman | May 26, | 1903 |
| 1,287,934 | Farnsworth et al. | Dec. 17, | 1918 |
| 1,703,111 | Kniatt | Feb. 26, | 1929 |
| 1,859,809 | Timbs | May 24, | 1932 |
| 1,903,315 | Priebe | Apr. 4, | 1933 |
| 1,912,993 | Murray | June 6, | 1933 |
| 1,993,269 | Fletcher | Mar. 5, | 1935 |
| 2,037,962 | Brown | Apr. 21, | 1936 |
| 2,132,575 | Moise | Oct. 11, | 1938 |
| 2,183,043 | Kerr | Dec. 12, | 1939 |
| 2,188,587 | Ames | Jan. 30, | 1940 |
| 2,233,455 | Larson | Mar. 4, | 1941 |
| 2,246,891 | Moise | June 24, | 1941 |
| 2,257,335 | Evans et al. | Sept. 30, | 1941 |
| 2,278,074 | Hauf | Mar. 31, | 1942 |
| 2,405,567 | Ferla | Aug. 13, | 1946 |
| 2,469,772 | Johnson | May 10, | 1946 |
| 2,484,087 | Hauf | Oct. 11, | 1949 |
| 2,531,401 | Clerke | Nov. 28, | 1950 |
| 2,546,096 | Hauf | Mar. 20, | 1951 |
| 2,878,040 | Hobbs | Mar. 17, | 1959 |

FOREIGN PATENTS

| | | | |
|---|---|---|---|
| 124,587 | Switzerland | Mar. 16, | 1928 |
| 504,566 | Germany | Aug. 6, | 1930 |